May 5, 1970 P. H. NOBLE 3,509,600
ELECTROHYDRAULIC SERVO CONTROL
Filed Oct. 30, 1967 5 Sheets-Sheet 1
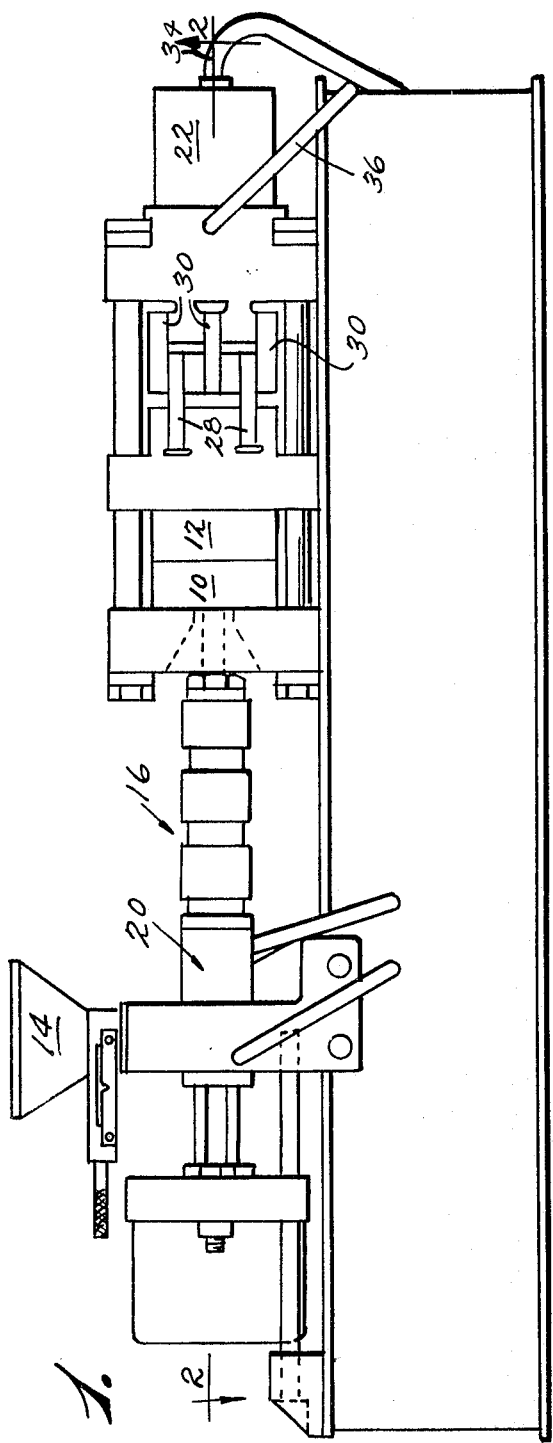
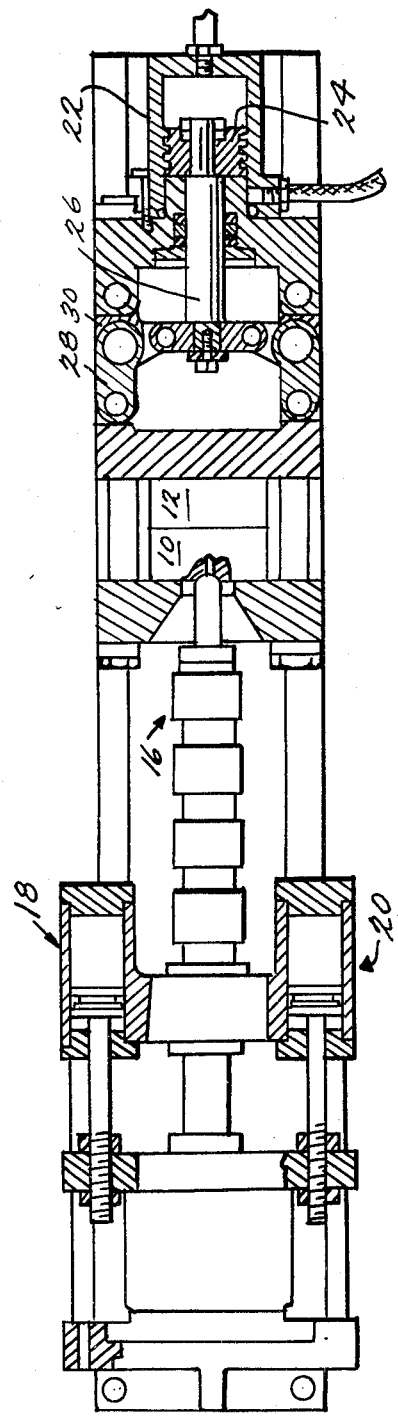
INVENTOR.
PAUL HODGSON NOBLE
BY
Cushman, Darby & Cushman
ATTORNEYS

FROM HIGH PRESSURE (CONDUIT 90)

INVENTOR.
PAUL H. NOBLE
BY
Cushman, Darby & Cushman
ATTORNEYS

United States Patent Office 3,509,600
Patented May 5, 1970

3,509,600
ELECTROHYDRAULIC SERVO CONTROL
Paul Hodgson Noble, Grafton, Vt., assignor to The
Fellows Gear Shaper Company, Springfield, Vt.,
a corporation of Vermont
Filed Oct. 30, 1967, Ser. No. 679,144
Int. Cl. B29f 1/02
U.S. Cl. 18—30                                                11 Claims

ABSTRACT OF THE DISCLOSURE

An improved servo control unit for a closed loop hydraulic circuit is described. The servo control unit receives programmed and adjusted electrical command signals for dictating hydraulic pressure differentials within the unit, and the hydraulic pressure differentials are utilized to control a reversible pump within a closed loop hydraulic circuit. The closed loop hydraulic circuit may include an injection molding machine, or other machine requiring a flow of hydraulic fluid to perform work, and all functions of the machine may be programmed into the servo control unit so as to actuate the pumping means and to dictate the direction and rate of hydraulic fluid flow from the pumping means.

Background and brief description of invention

The invention relates to an improved closed loop hydraulic circuit and servo control unit therefor which are especially useful in combination with hydraulically operated apparatus, and the invention has particular application to injection molding apparatus.

It is known in the prior art to provide some form of hydraulic system for controlling and actuating injection molding machines. Typical prior art systems are represented by the Patents 2,484,907 to Purcell, 2,680,883 to Ashbaugh, and 3,226,769 to Williamson et al. In typical prior art systems and circuits, a pumping means is provided for directing hydraulic fluid to hydraulically controlled devices associated with injection molding machines. The usual injection molding machine includes hydraulically operated means for extruding a plastic material into a mold cavity, and separate hydraulically operated means are provided for pressing and clamping the material within the cavity in accordance with a sequence of operation which (a) fills the cavity with plastic material (b) presses and clamps the material within the cavity, and (c) unclamps the mold cavity so that a partially cured molded product can be removed therefrom. However, injection molding machines of the type just described have required relatively complex hydraulic systems attaining high pressures and for controlling and activating all functions of the machines. The known hydraulic systems have required large reservoirs for hydraulic fluid, and very complex valving arrangements have been utilized to control the flow of fluid through the entire system in accordance with the requirements of the injection molding machine. Of course, the successful operation of an injection molding machine requires a certain amount of automation so that extrusion, pressing, and unclamping can be rapidly sequenced with little manual effort or control. Thus, the known systems have required complex pumping and valving equipment for handling relatively large volumes of fluid, and for cooling and storing the same during certain periods of operation, and additionally, there has been a requirement for costly electrical control devices for operating numerous switches and solenoid valves associated with such systems.

The improved control system of the present invention provides for a closed loop hydraulic circuit which substantially reduces fluid volume requirements within the system, and all major hydraulic control functions are handled by a single reversible pump which is included within the closed loop system. Further, the closed loop system of the present invention eliminates prior art requirements for complex valving and costly electrical control since direction and rate of flow of hydraulic fluid are determined by the reversible pumping means included within the system. In addition to including a reversible pumping means within a closed loop system, the invention also provides for a novel servo control unit which is connected to the reversible pumping means to dictate direction and rate of flow in accordance with a programmed sequence of operation. The servo control unit is combined with an electrical system for comparing command signals with actual performance of the reversible pump, and any discrepancies between actual performance and commanded performance are adjusted within the control system continuously and without a requirement for complex valving and switching devices. The servo control unit also includes means for manually overriding the command functions of whatever sequence is programmed into the entire system, and the manual overriding means is constructed to prevent further clamping movements of an injection molding machine during a cycle of operation.

Thus, the invention provides for a hydraulic system, and a servo control unit, which are more easily manufactured and more reliable in operation than prior systems. The servo control unit of the present invention is combined with an electrical control system which automatically adjusts the control unit to correct for erroneous signals or other errors in actual performance, and a safety feature is provided for manually overriding an injection molding machine operation so as to prevent any further clamping actions of the machine. The system of this invention is operated at a lower cost and with less maintenance than prior devices because complex valving and switching devices are eliminated, and also, electrical control requirements are reduced to relatively light inductive loads of the type required to merely provide machine logic.

Although the invention has particular utility in controlling the operation of injection molding apparatus, it is contemplated that the simplified and improved hydraulic system of this invention will be useful wherever hydraulic fluid is utilized to perform work with a machine which responds to differences in direction and pressure of hydraulic fluid flow. The features of the invention permit a number of machines to be automatically operated by computer or by other programming systems.

Considering the invention in greater detail, there is provided a closed hydraulic circuit to and from a machine which utilizes hydraulic fluid flow for performing work. Reference to a "closed loop circuit" in this application is intended to define a hydraulic circuit which contains working fluid within the circuit and without a requirement for directing all fluid flow through a reservoir. Thus, the closed circuit of this invention can be envisioned as any circuit in communication between a pumping device and a work performing machine so as to carry a flow of hydraulic fluid back and forth to the machine without carrying all fluid into and out of a large reservoir. The closed circuit of this invention eliminates a requirement for large volume reservoirs, and it is only necessary to provide relatively small reservoirs which include sufficient hydraulic fluid to make up small volumes of fluid to compensate for volumetric changes in the system as pistons and other hydraulic devices change their volumetric requirements. The inclusion of working hydraulic fluid within a circiut communicating with a machine is made possible by connecting the circuit to a reversible pumping means which can be controlled to dictate flow of fluid, at varying rates, back and forth in the circuit. Although reversible pumping means are, in themselves, old in the art, there has been no workable system for including a reversible pumping means in a hydraulic system of the type required for multi-functional machines. Further, there has been no known control means for a reversible pump which will automatically control the actuation, and direction and rate of flow of fluid from such a pump.

The reversible pumping means of the present invention is controlled by a servo unit which receives command signals from a preset logic system associated with the machine which is to be operated and controlled. The control unit includes a piston which can reciprocate back and forth within a cylinder in accordance with hydraulic pressure differentials established on opposite ends of the piston. Varying pressure differentials are established by a modulating valve means included within the control unit, and the modulating valve means functions to direct high pressure hydraulic fluid from the closed loop circuit to opposite ends of the piston in accordance with a sequence of operation transmitted to the modulating valve means. The modulating valve means may be a solenoid valve which is closed and opened to varying degrees in accordance with a magnetic field established in a coil, and the modulations of the valve are dictated by command signals transmitted to the coil. Thus, a logic system can be preset to dictate signals to the coil so that the piston means can be moved hydraulically to different positions within the piston cylinder, and the position of the piston means is utilized to operate the reversible pump and to determine the direction and rate of flow of hydraulic fluid from the pump. Positions of the piston can be relayed to an actuating mechanism associated with the pump through a connecting rod which connects the piston with whatever actuating mechanism is incorporated in the pump. In a preferred embodiment of the invention, the reversible pump which is utilized is of the type which includes a plurality of piston elements which can be set in various pumping positions by a yoke or cage which adjusts the range of pumping movements for the individual piston elements. Such a pump can be controlled by adjusting the angular position of the yoke in accordance with a desired rate or direction of fluid flow from the pump, and when this type of pumping means is utilized, the connecting rod of the control unit relays piston positions to the yoke of the pump. Thus, whatever position is established for the piston within the servo control unit will be relayed to the yoke of the pump so as to dictate direction and rate of flow of hydraulic fluid throughout the system.

The invention also provides for an adjustment of the servo control unit to compensate for erroneous signals or other errors in actual performance of the pumping means as related to commanded performance for the pumping means. Adjustment of the control units is accomplished by comparing the actual position of the pump yoke, or the connecting rod which moves the pump yoke, to whatever position was commanded by the logic system. This is done by translating the linear movements of the connecting rod onto a feedback potentiometer which translates such movements into an electric signal. The electric signal generated by the feedback potentiometer is compared to a signal from a command potentiometer, and differences in the signals are utilized to adjust command signals to the modulating valve of the control unit. Adjusted signals to the modulating valve will adjust the position of the piston within the control unit, and this adjustment will be relayed to an adjustment of position for the pump yoke. In this way, erroneous signals, or errors in actual pump yoke position, are immediately and continuously compared to commanded positions, and any differences are translated into adjustments within the pump itself. In a similar manner, actual hydraulic pressure within the system is compared to present limits for the system, and any differences will be translated, by electrical circuiting, into appropriate signals for overriding and adjusting commanded performance.

A safey feature is provided for the hydraulic system of the present invention by a manual overriding means incorporated in the servo control unit. The manual overriding means comprises a means for dumping hydraulic fluid from one side of the piston means so as to limit further reciprocation of the piston. Thus, whatever programmed sequence has been dictated to the servo control unit will be interrupted by the dumping of hydraulic fluid from the cylinder in which the piston travels. The overriding means is preferably in the form of an outlet conduit which communicates with the piston cylinder so as to limit travel of the piston in one direction. This arrangement provides for a very safe and reliable control of injection molding machines inasmuch as the overriding means can be arranged to prevent any clamping or pressing movement of the machine, while at the same time, permitting opening movements of the machine. The machines which may be controlled by the improved system of this invention may be of the type which produce extremely high pressures on mold parts and other clamping elements, and it can be appreciated, that the greatest safety concerns with such equipment reside in an ability to halt clamping movements and to provide opening movements when a dangerous situation arises. Thus, the manual overriding system of this invention provides for an ideal manual control over injection molding machines, or any other machines which present safety concerns from high pressure reciprocation of various elements of the machine.

These and other features and advantages will become apparent from the more detailed discussion which follows and in that discussion reference will be made to accompanying drawings described below.

Detailed description of drawings

FIGURE 1 is a side elevational view of an injection molding apparatus of the type which can be operated by the control systems of this invention;

FIGURE 2 is a partial cross sectional view of the apparatus of FIGURE 1, as seen on a horizontal plane extending along lines 2—2 of FIGURE 1;

Detailed description of invention

Figure 3:
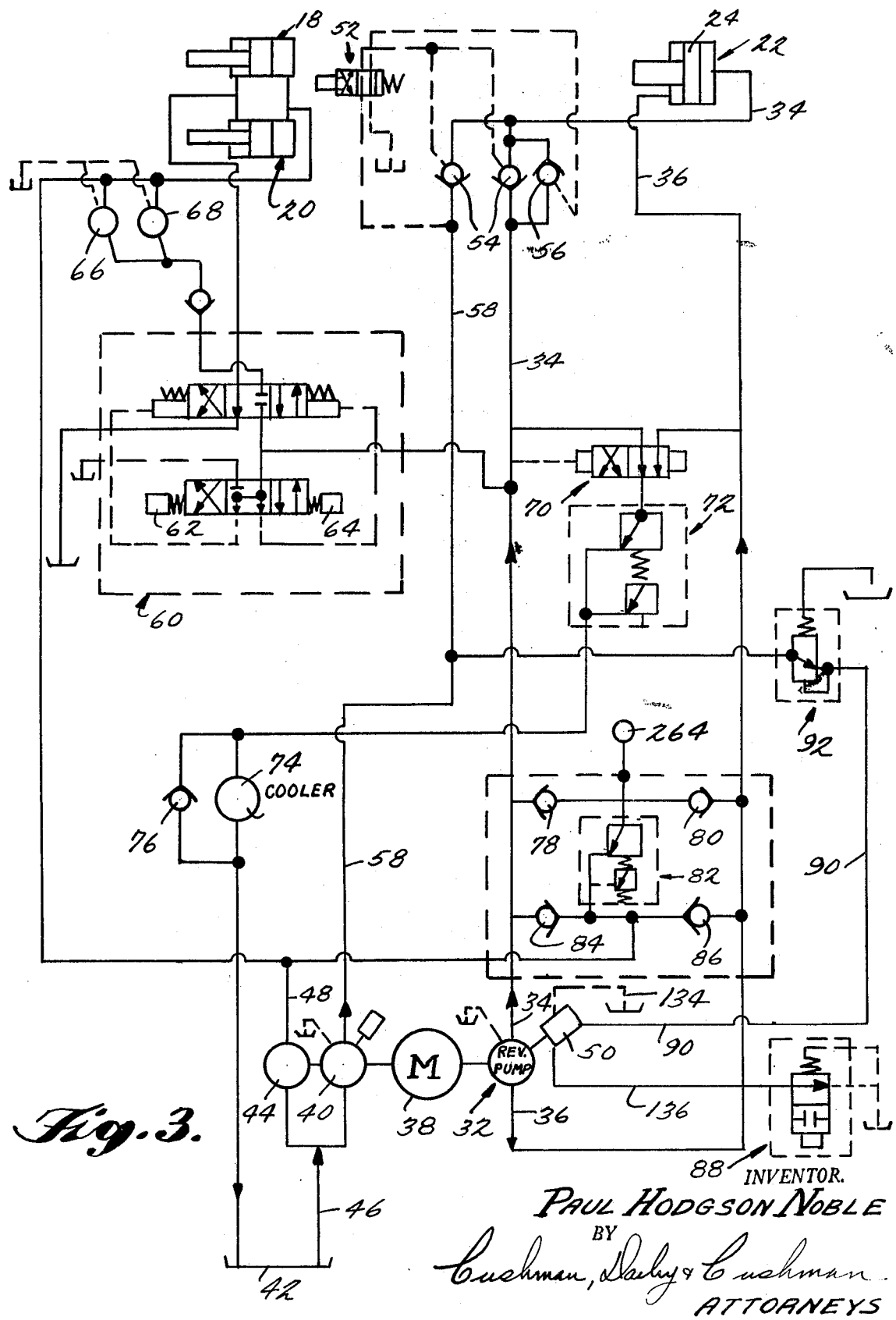
FIGURE 3 is a schematic diagram of a closed loop hydraulic system which is a part of the present invention.

FIGURES 1 and 2 illustrate typical apparatus which may be controlled by the closed loop hydraulic circuit and servo control system of the present invention. Although it is contemplated that any apparatus having a number of working operations may be controlled by the systems of this invention, it is of special significance that injection molding machines of the type shown in FIGURES 1 and 2 can be controlled automatically and safely by the features of the present invention. The injection molding machine shown in FIGURES 1 and 2 is of a well-known construction, and does not form a separate part of this invention. A typical injection molding machine is illustrated in detail in Williamson et al. Patent 3,226,769, but other types of molding machines, and other hydraulically operated devices, may be controlled by the system which will be discussed for this invention.

Basically, the injection molding apparatus which is illustrated includes mold halves 10 and 12 which define a mold cavity between them when they are brought together in the clamped relationship shown in FIGURES 1 and 2. A supply hopper 14, together with a hydraulically operated, rotary, extruder mechanism 16, provides for an injection of material in a plastic state into the mold cavity provided in the mold halves 10 and 12. Of course, the introduction of plastic material into the cavity must be timed to take place only when the mold halves 10 and 12 are in clamped positions so that there is no leakage of material from between the mold halves. FIGURE 2 also illustrates a pair of hydraulic cylinders 18 and 20 which function to advance and retract the injection extruder 16 in accordance with a predetermined cycle of operation. Also, the figures illustrate a separate clamping cylinder 22 which functions to clamp and unclamp the mold halves 10 and 12 in accordance with an advancement or retraction of a piston 24 carried within a hydraulic cylinder. The piston 24 is connected by a shaft 26 to linkage elements 28 and 30 which are pivotally connected to each other so as to fold and unfold in accordance with the direction of movement of the piston 24. In the position shown in FIGURE 2, the linkage elements 28 and 30 are completely unfolded and in a position to clamp the mold halves 10 and 12 together. All of the structures and arrangements just described are well known in this art and do not form a separate part of this invention; however, it is worth noting that injection molding machines of the type contemplated by this invention operate very rapidly and with very high pressures and forces. For example, over 250 tons of force may be applied to mold parts by the hydraulic clamping ram 22 and its associated linkage system. Once the mold halves are in a clamped position, a typical injection pressure within the mold cavity may be 20,000 p.s.i.g. Typically, the injection molding machine may operate through a complete cycle every five seconds, and this includes a clamping of the mold halves, injection of plastic material into the mold cavity, partial curing of the molded article, and a separation of the mold halves to effect a removal of a molded article from the mold cavity. All of these steps are carried out in sequence very rapidly, and, in accordance with the present invention, all steps can be carried out automatically by a programmed sequence or by a sequence dictated by a computer. Recognizing the very high forces and pressures which exist in injection molding operations, it can be seen that safety is a very important requirement around machinery of this type, and it will be seen that the invention provides for automatic unclamping of the machine, irrespective of what part of a cycle it is in, when unsafe conditions are detected by an operator.

FIGURE 3 is a schematic diagram of the improved hydraulic system of the present invention, as associated with an injection molding machine of the type shown in FIGURES 1 and 2. In contrast with prior art hydraulic systems, the system shown in FIGURE 3 is a closed loop hydraulic system which utilizes a reversible pumping means 32 to control the direction of hydraulic fluid flow through the system. Prior art systems have utilized unidirectional pumping devices together with complex valving and switching arrangements for pumping hydraulic fluid into relatively large reservoir systems and for subsequently using hydraulic fluid out of the reservoir system to carry out working operations of whatever machine is being controlled. In the context of this application, the reference to a "closed loop" hydraulic system is meant to describe a system of conduits and circuits which at all times contain working hydraulic fluid for operating the machine, and this means that the usual requirements for directing all fluid flow through large reservoirs are eliminated.

The hydraulic system of the present invention does utilize a relatively small reservoir, but this reservoir functions only to contain make-up volumes of hydraulic fluid which compensate for changes in volumetric capacity of the entire working system. These changes are a result of pistons changing positions in cylinders and of other changes in the working system which cause volumetric demands to adjust. The closed loop system which is shown in FIGURE 3 is feasible because of a provision for a reversible pumping means 32 which can pump hydraulic fluid through the system in either of the directions indicated by the arrows. One direction of flow from the pump 32 may go in the direction indicated through the main line conduit 34 which ultimately communicates with the clamping cylinder 22 so as to advance the clamping piston 24 in a direction which clamps the die halves 10 and 12 (see FIGURES 1 and 2). A second direction of flow from the pump 32 may go through a second main conduit 36 which ultimately communicates with an opposite side of the piston 24 of the clamping cylinder 22. Thus, it can be seen that a closed loop, in the sense of the present invention, is provided by the two main conduits 34 and 36 which communicate between the reversible pump 32 and opposite ends of the clamping cylinder piston 24. Also, the closed loop system includes conduits which carry flow to other working portions of whatever apparatus is being operated. By reversing direction of flow from the pump 32, the piston 24 can be advanced or retracted, and there is no requirement for the working hydraulic fluid of the system to first pass into a large reservoir, as has been typical in prior art arrangements. By combining a reversible pumping device with a closed loop system of conduits, it is possible to eliminate many of the complex valving devices, and requisite electrical induction loads for operating the same, as used in prior art systems.

Considering FIGURE 3 in greater detail, the reversible pumping means 32 is driven by an electric motor 38. The electric motor 38 may also drive a variable displacement pump 40 which functions to maintain a sufficient hydraulic pressure in the conduit 34, at its communication with the clamping cylinder 22, to apply a clamping pressure on one side of the piston 24. This pressure assures a tight clamping of the mold halves 10 and 12 once the piston 24 has been advanced to a clamping position by a flow of hydraulic fluid through the main conduit 34 from the pump 32. Of course, the clamping pressure which is provided by the pump 40 is released when the pump 32 is reversed to dictate a flow of hydraulic fluid through the conduit 36 communicating with the rod end of the piston 24. A relatively small reservoir 42 is provided for containing make-up fluid for the entire system, and all other symbols for reservoirs shown in the schematic drawing of FIGURE 3 actually comprise the single reservoir 42. A fixed displacement pump 44 communicates with the reservoir 42 to pump fluid out of the reservoir, by way of conduit 46, to all portions of the hydraulic system through a conduit 48 so as to satisfy all requirements for hydraulic fluid, whether for initially filling the system or for providing make-up fluid where needed. Also, FIGURE 3 illustrates a number of solenoid operated valves, and other valving devices, which function to control direction of flow of fluid throughout the system in accordance with a programmed sequence of signals which are relayed to the hydraulic system from an electrical control system. The electrical control system will be discussed in greater detail with reference to FIGURE 7. However, for purposes of understanding the hydraulic system of FIGURE 3, it is sufficient to understand that the reversible pump 32 is controlled in both its direction and rate of flow by a servo control unit 50. The discussion which immediately follows will describe functions of the hydraulic system as related to an operation of an injection molding machine.

When the servo control unit 50 dictates that the reversible pump 32 pump fluid in a direction through conduit 34, a solenoid valve 52 is automatically energized to release the power check valves 54 and to close the power check valve 56. The opening of the power check valve 54 permits a flow of fluid through the conduit 34 to the head end of the piston 24 so as to move the piston in a clamping direction, and also, hydraulic fluid can flow through the conduit 58 (from pump 40) to maintain a clamping pressure on the head end of the piston 22 once the mold halves have been clamped. After the mold halves have been clamped, an electrical signal is directed to a three-position, hydraulically piloted, four-way valve 60. The electrical signal energizes a solenoid 62 of the valve 60 to direct fluid flow to the injection cylinders 18 and 20. Hydraulic fluid flow is directed to the rod ends of the two cylinders 18 and 20 to advance the injection mechanism 16 to its limit so that molten material can be injected into the clamped mold cavity. Once the injection stroke has reached its limit, a programmed electrical signal de-energizes the solenoid 62 and energizes a solenoid 64 so as to permit flow of hydraulic fluid to two hydraulic motors 66 and 68. The hydraulic motors 66 and 68 function to rotate an extruder associated with the injection mechanism, as is well known in the art, to convey material from a hopper 14 and to prepare the material for a subsequent injection into a mold cavity. Thus, there is provided a system for sequentially clamping a mold, injecting molten material into the mold, maintaining a pressure on the mold halves while a molded article within the cavity cures, and operating an extruder to prepare a subsequent batch of material for injection. Once these steps have been completed, the solenoid 64 is de-energized, thereby stopping the rotation of the extruder. Then, the servo control unit 50 reverses the pump 32 so as to direct hydraulic fluid flow through the conduit 36 and to the rod end of the clamping cylinder 22. When the pump 32 is reversed, the solenoid 52 is de-energized so that hydraulic fluid from the head end of the clamping cylinder 22 can reverse its flow through the conduit 34 by way of the released power check valve 56. Of course, it is understood that during operation, the entire hydraulic system is maintained filled by the pump 44 which supplies make-up fluid whenever the closed loop system increases its total volume requirements. When the system decreases its volumetric requirements, provision is made for carrying excess hydraulic fluid through a two-position, three-way valve 70 which is hydraulically operated by line pressure. Changes in the volumetric requirements of the closed loop system will adjust line pressure so as to move the valve 70 in a position to dump excess fluid through a relief valve 72 and back to the reservoir 42 by way of an oil cooler 74. A check valve 76 is provided in a bypass line around the cooler 74 to protect the oil cooler from flying surges. Check valves 78 and 80 provide direction to the system and relief protection by directing high pressure oil to a relief valve 82. The additional check valves 84 and 86 function to direct prefill hydraulic fluid from the pump 44 to the low pressure side of the reversible pump 32. As will be discussed in greater detail with reference to FIGURES 4 through 6, the reversible pump 32 can be overridden in its programmed sequence of operation by a manually operated safety valve 88 which causes the servo control unit 50 to direct the pump 32 to deliver hydraulic fluid only in a direction through conduit 36. This safety valve feature not only prevents further clamping movement of the clamp cylinder 22, but also, the piston 24 within the cylinder 22 is caused to immediately move in a direction which opens the mold halves 10 and 12. Thus, any dangerous clamping movements can be interrupted and unclamping movements are initiated irrespective of a programmed sequence of movements. The servo control unit 50 receives high pressure hydraulic fluid through a conduit 90; however, pressure is reduced by a pressure reducing valve 92 before fluid is actually admitted to the servo control unit 50.

Figure 4:
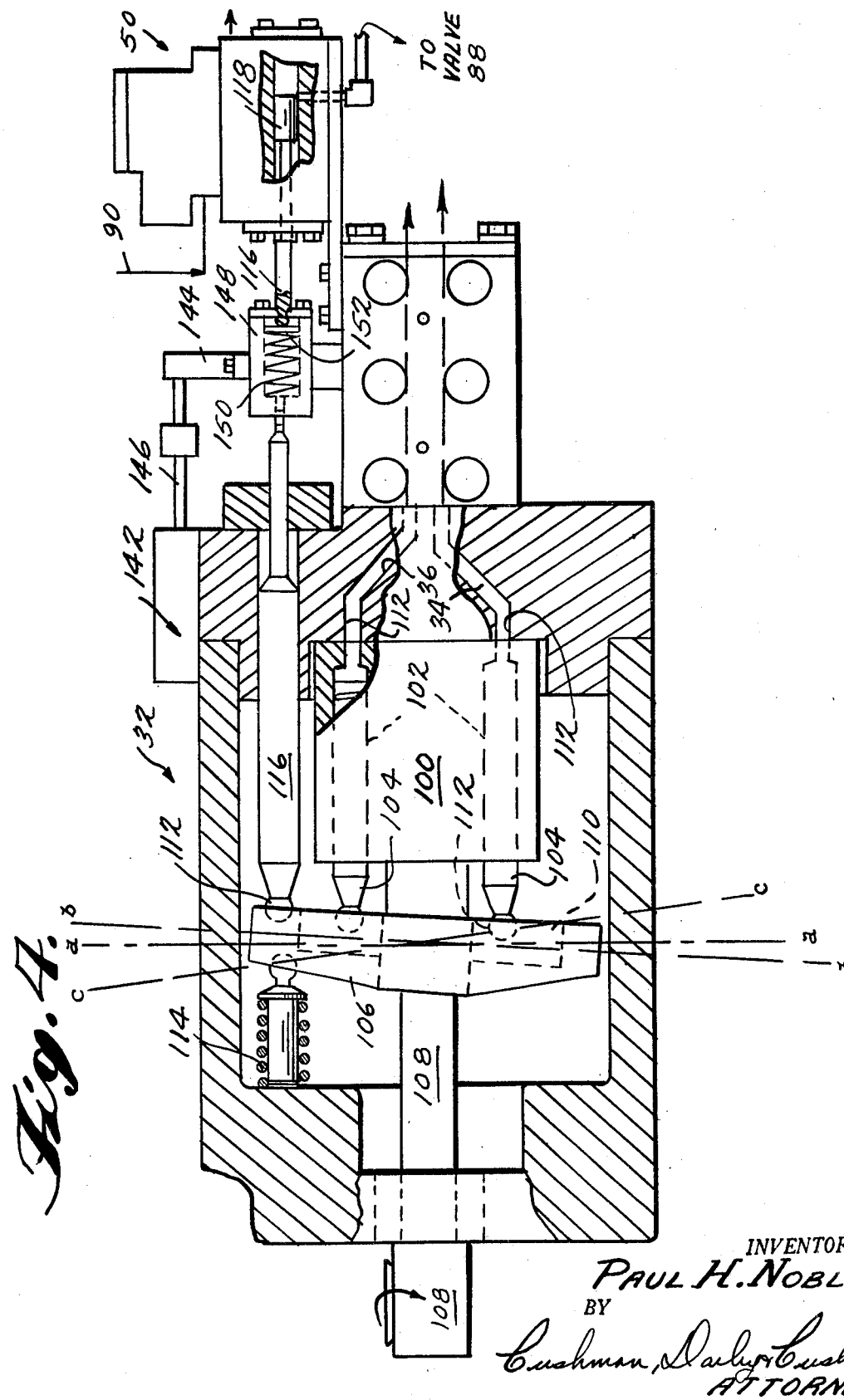
FIGURE 4 is a vertical, cross sectional view of reversible pumping means for use in the closed hydraulic circuit of this invention, and showing a servo control unit for controlling the pumping means.
Figure 5:
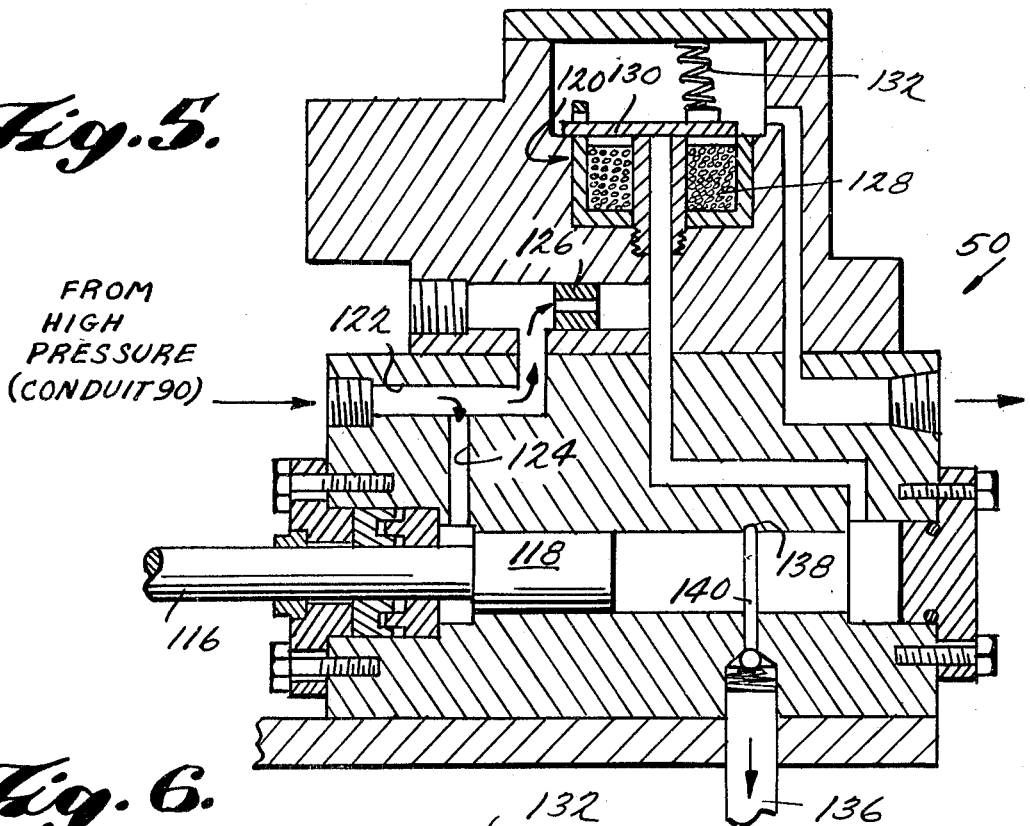
FIGURE 5 is a vertical, cross sectional view showing details of the servo control unit used in combination with the closed circuit system of the present invention.
Figure 6:
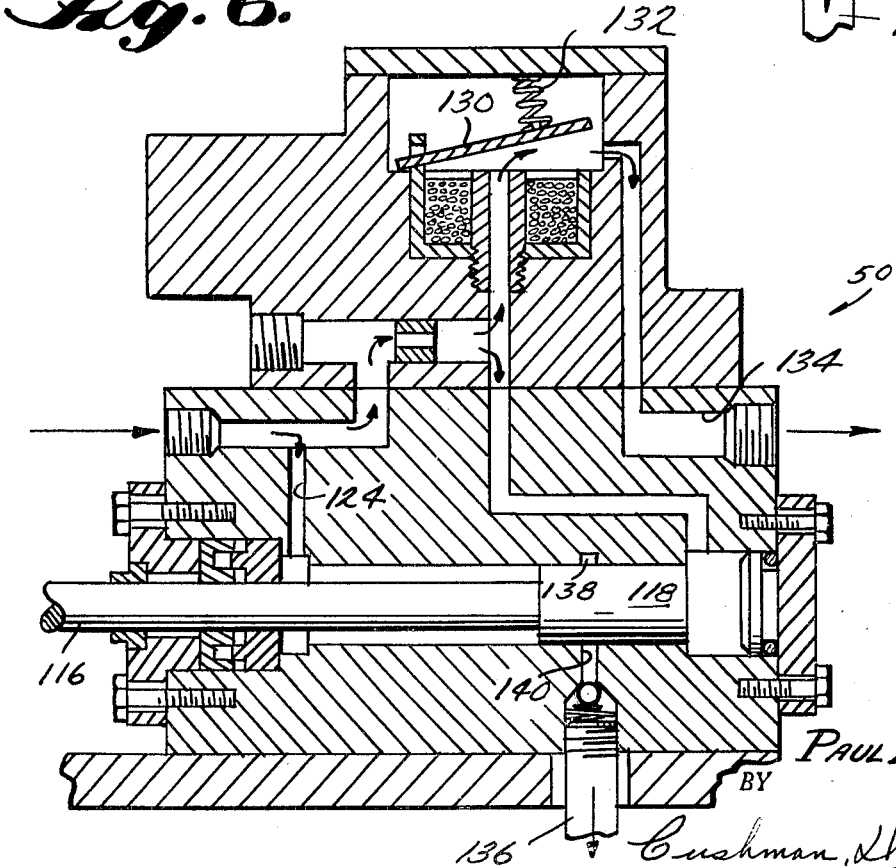
FIGURE 6 is a cross sectional view similar to FIGURE 5 but showing the servo control unit in an adjusted position of operation.

The reversible pump 32, and a novel servo control unit therefor are illustrated in detail in FIGURES 4 through 6. FIGURE 4 illustrates details of the pump 32, and FIGURES 5 and 6 illustrate details of the servo control unit 50, as combined with the pump 32.

The reversible pump 32 which is used with the closed loop system of this invention may be of any known construction to provide for reversible pumping of hydraulic fluid through either of the conduits 34 or 36, as discussed with reference to FIGURE 3. However, a particularly useful pump construction is shown in FIGURE 4, and the illustrated pump is of a type sold by Vickers Company under the model PVB–45. The type of pump which is illustrated does not form a separate part of the present invention; however, this invention does provide for a novel automatic control of pump actuation, direction of flow, and rate of flow for such a pump construction. The pump 32 is of a type which includes a rotor block 100 having a plurality (usually nine) of cylinders 102 formed therein. Piston elements 104 (only two being shown, for clarity) are mounted for reciprocation within the cylinders of the rotor block 100 and reciprocations of the pistons 104 are determined by the angular position of a yoke or frame member 106. A main drive shaft 108 is connected to the electric motor 38 (discussed with reference to FIGURE 3), and the drive shaft 108 is rotated in a single direction of rotation for all pumping actions of the pump 32. The drive shaft 108 is mounted so that it can be rotated through a wall portion of the pump housing, and suitable bearing and sealing devices are provided for mounting the drive shaft 108 through the pump housing. The drive shaft 108 is secured to the rotor block 100 so as to rotate the same when the drive shaft is rotated. When the rotor block 100 is rotated, all of its piston elements 104 are carried around with the rotating rotor block 100, and the piston elements 104 are reciprocated in accordance with the angular settings of the yoke 106. The yoke 106 does not rotate with the rotation of the drive shaft 108 and the rotor block 100, and a separate plate 110 is mounted within the yoke 106 to receive and hold end posts 112 of the various piston elements and to rotate with the piston elements within the yoke 106. Of course, suitable bearing means are provided so that the inner plate 110 can rotate relative to the non-rotating yoke 106. As each piston element 104 travels around the axis of the drive shaft 108, its reciprocal movements within the cylinder 102 are dictated by the plane in which the piston's head element 112 must travel. The extent of reciprocation, and the place where reciprocation takes place during rotation determines the direction and rate of flow of hydraulic fluid which is pumped out of the separate cylinders 102 into the receiving conduits 34 and 36. Of course, pumping action of each piston element 104 takes place over a range of rotary travel of the block 100, and therefore, the receiving conduits 34 and 36 are crescent-shaped at their inlet ends 112 so as to receive pumped fluid from a range of positions for a piston element which is pumping while it is moving past either of the inlets 112. All of this structure is known in the art and is discussed only to indicate the environment in which the present invention has particular usefulness. It can be seen that the angular positions of the yoke member 106 determines whether hydraulic fluid is being drawn into or pushed out of the rotor block 100 at any given point in its rotation. The dashed line $a$—$a$ indicates a neutral position for the yoke 106 wherein the yoke would be at 90° to the axis of rotation of the shaft 108. In such a position, no pumping action at all would take place, and it is necessary to displace the yoke to one side or the other of the neutral position $a$—$a$ before pumping can be effected. In the position shown in FIGURE 4, the yoke member 106 has been moved clockwise to the angular position $b$—$b$, and this position dictates a pumping action which pushes hydraulic fluid out of the cylinders 102 during the upper half of their travel about the axis of the rotating drive shaft 108. Thus, in the position shown in FIGURE 4, hydraulic fluid is pumped through the conduit 36 and drawn back through the conduit 34. The extent of reciprocation of the piston elements 104 within their respective chambers 102 is determined by the extent of angular displacement of the yoke 106 away from the neutral position of a—a. Thus, the direction of flow and the rate of flow can be dictated by displacing the yoke member 106 one way or the other, and to varying degrees, in its angular displacement away from the neutral position of a—a.

In the arrangement shown in FIGURE 4, the yoke member 106 is normally biased clockwise in the b—b direction by a spring means 114 which is mounted to press against the outer stationary shell of the yoke member 106. The extent to which the spring means 114 can displace the yoke 106 is determined by the position of a connecting rod 116 which contacts an opposite face of the yoke member 106. Axial movement of the control rod 116 will either permit greater displacement of the yoke member 106 by the spring means 114, or overcome the bias of the spring 114 so as to displace the yoke member in the c—c direction. One of the important features of the present invention is to provide for a novel means for controlling axial displacements of the connecting rod 116 so as to automatically control all functions of the reversible pumping means 32. Directional movements of the connecting rod 116 are dictated by the servo control unit 50, and this unit will be discussed in greater detail with reference to FIGURES 5 and 6.

FIGURES 5 and 6 illustrate vertical, cross sectional views of control unit 50 which automatically commands movements to the connecting rod 116, and thereby, to the yoke member 106 of the pump 32. The control unit 50 includes a piston element 118 which can reciprocate within a cylindrical chamber formed within the control unit. Movements of the piston element 118 are determined by a controlled flow of hydraulic fluid to opposite ends of the piston element, and movements of the piston 118 will be translated into angular movements of the yoke member 106. The connecting rod 116 is secured at one end of the piston 118, and at an opposite end to the yoke member 106. Although the connecting rod 116 may be considered a continuous integral structure, a preferred form of a connecting rod assembly is illustrated in FIGURE 4 so that correct alignment of the rod with pump 32 is provided. However, for purposes of discussion, the connecting rod assembly 116 may be considered a continuous and rigid structure extending between the piston 118 and the yoke 106. The servo control unit 50 receives operational hydraulic fluid from the closed loop system, and a solenoid operated valve 120 within the servo unit 50 directs high pressure hydraulic fluid through the unit so as to move the piston 118 to programmed positions which dictate a sequence of pumping operations for the pump 32. As discussed with reference to FIGURE 3, the servo control unit 50 may receive high pressure hydraulic fluid from a conduit 90 and the pressure of the fluid may be reduced by a pressure reducing valve 92 prior to introducing the fluid into the servo control unit. As seen in FIGURES 5 and 6, the high pressure hydraulic fluid enters the servo control unit through a passageway 122, and from there the high pressure fluid flows through a passageway 124 to the rod end of the piston 118. Thus, the rod end of the piston 118 is subject to high perssure hydraulic fluid at all times, and regulation of the piston position is accomplished by controlling the pressure of hydraulic fluid available to the opposite end of the piston 118. From the passageway 122, high pressure hydraulic fluid also flows through a restrictor 126, and from there, the hydraulic fluid can flow to the head end of the piston 118 and through the solenoid operated valve 120 when a coil 128 is de-energized so as to release a valve plate 130. FIGURE 5 shows the valve plate 130 in a closed position, as determined by a magnetic field established in the coil 128, and FIGURE 6 shows the valve plate in a partially opened position. The solenoid operated valve 120 should be considered a mudulating valve in the sense that the valve plate 130 will open to a number of positions in accordance with the intensity of the magnetic field of coil 128, and this provides for a modulation of flow through the solenoid operated valve 120. A spring means 132 normally biases the valve plate 130 to a completely open position when the coil 128 is completely de-energized. In this way, the piston 118 can be positioned entirely by a signal received by the coil 128, and signals to the coil 128 are dictated by a programmed sequence which will be discussed in greater detail with reference to the electrical schematic of FIGURE 7.

Considering the available positions which can be dictated to the piston 118, FIGURE 5 shows a sequence of control wherein the piston 118 is moved to its limit position towards the left of the figure. This position is dictated by a closed position of the valve plate 130 and the resulting flow of high pressure fluid to both ends of the piston 118. When high pressure fluid flows to both ends of the piston 118, the piston will be moved towards its connecting rod end since the surface area of the head end of the piston is greater than the surface area of the rod end of the piston. When the valve plate 130 is opened, a pressure differential is established on opposite sides of the restrictor 126 in accordance with the degree of opening of the valve plate 130. The opening of the valve plate 130 allows a portion of the hydraulic fluid to leave the servo control unit through the outlet conduit 134, and the restrictor valve 126 then causes a pressure differential to become established on opposite ends of the piston 118. Depending upon the degree of opening of the valve plate 130, the piston will move in the direction of its head end (towards the right in FIGURE 6), and an extreme opening of the valve plate 130 will advance the piston to its limit position. Intermediate positions of the piston are dictated by a modulation of the valve plate 130 between partially opened and fully opened position.

As discussed in my copending application entitled "Hydraulic Servo Cylinder Override" filed even date herewith, the servo control unit 50 has a further feature in a provision of a means for manually overriding whatever positions are dictated to the valve plate 130 and to the piston 118. The overriding means is in the form of a dumping conduit 136 which functions to dump hydraulic fluid from the head end of the piston 118 so that the piston can travel only towards the right of the illustrated unit. The dumping conduit 136 is controlled by a manually operated valve 88 which can be opened whenever an operator detects and unsafe condition or any condition which would require an interruption of a programmed sequence of operation for a machine. In the use of this safety feature with an injection molding apparatus, it can be seen that a dumping of hydraulic fluid from the head end of the piston 118 will automatically cause the yoke member 106 to be displaced clockwise to the b—b position, and as already discussed, this displacement assures a pumping direction through the conduit 36 and to the rod end of the clamping cylinder 22. Thus, the clamping cylinder 22 is immediately moved to an unclamping position whenever the manual safety valve 88 is operated to dump hydraulic fluid through the conduit 136. If the safety valve 88 is operated when the piston 118 is in the position shown in FIGURE 5, the piston will advance only to the point of an annular groove 138 provided within the piston chamber. This position is shown in FIGURE 4 wherein the piston 118 has advanced to a position which partially covers an outlet 140 associated with the annular groove 138 and the dumping conduit 136. Further movement of the piston does not take place because of the piston itself partially restricts the outlet 140 so as to create a pressure differential at the outlet. This differential is sufficient to stop the piston in an intermediate position along the length of the chamber in which it travels. It is preferred to stop the piston 118 at some intermediate position so as to set the yoke 106 at an angle which causes an unclamping of mold parts at a very slow rate (for example, the b—b position of FIGURE 4). It is virtually impossible to stop the piston in a position which would assure a neutral positioning of the yoke 106, and therefore, the preferred arrangement provides for a slight tilting of the yoke in a direction which unclamps the mold parts but which pumps hydraulic fluid at a relatively low rate. When the piston is in the FIGURE 6 position at the time of overriding, the cylinder 22 is already operating in an unclamping direction, and a subsequent command to move the piston back to the FIGURE 5 position will be interrupted when the piston reaches the position of annular groove 138. Other features of the manual override system are discussed in my above identified copending application, and such features include a provision of a check valve in close proximity to the outlet 140 (and in the conduit 136) so as to reduce line resonance and volumetric requirements for operating the override system.

In addition to a novel servo system for controlling a reversible pump of the type shown in FIGURE 4, an electric control system is provided for comparing actual performance of the pump with whatever performance is commanded to the servo control unit 50. Furthermore, any discrepancies between actual performance and commanded performance result in an adjustment of command signals to the servo control unit 50 so as to effect an adjustment of the servo piston 118 and the pump yoke 106. Referring to FIGURE 4, there is shown a means for translating linear positions of the connecting rod 116 into electrical signals through a feedback potentiometer 142 of any well known construction. The connecting rod 116 may include a bracket 144 connected to a part of the rod assembly, and the bracket travels along with axial movements of the rod. The bracket 144 includes an arm 146 which adjusts a feedback potentiometer 142 in accordance with linear positions of the arm 146. The bracket 144 and its control arm 146 may be carried by the connecting rod 116 in any suitable manner, but a preferred arrangement is shown wherein the bracket is attached to an alignment block 148 which separates the connecting rod 116 into two separate parts. The alignment block 148 may include a spring 150 within a bore, and the spring 150 presses a plate member 152 against an end of one portion of the connecting rod 116 associated therewith. The block 148 functions to keep the connecting rod portion which moves the yoke 106 in perfect alignment with a bore formed through the housing of the pump 32. Any differences in alignment which might otherwise result from stresses within the rod, or vibrations withtin the system, are eliminated by the interposing of the alignment block 148 between two portions of the connecting rod 116. The operation of the electrical command and adjustment systems will be discussed in greater detail in the following description of FIGURE 7.

Figure 7:
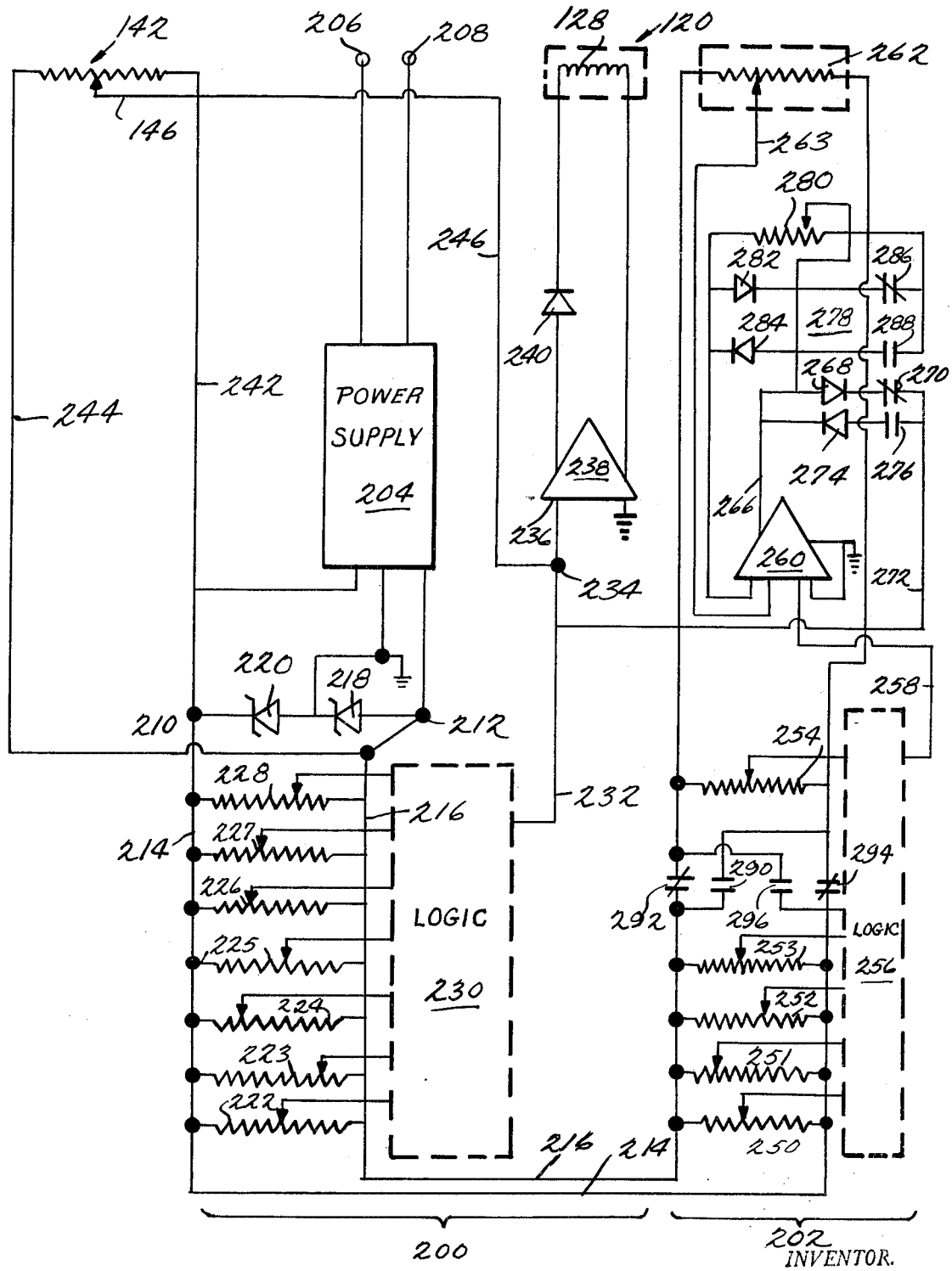
FIGURE 7 is a schematic diagram of an electrical system which dictates programmed commands to the servo control unit, and including means for adjusting command signals in accordance with comparison factors within the hydraulic system which is being controlled.

The electrical control circuitry of the present invention is shown in FIGURE 7 and generally comprises a direction and volume control section 200, and a pressure limit override section 202. Both of these sections are supplied by the double ended power supply 204 which is adapted to be energized by a suitable source of AC potential (not shown) connected to input terminals 206 and 208. The positive and negative output terminals 210 and 212 are connected to the positive and negative voltage buses 214 and 216 respectively, and are also connected to a reference potential such as ground through Zener diodes 218 and 220, respectively. The Zener diodes 218 and 220 hold the power supply output at a constant voltage equal to the Zener breakdown voltage.

The direction and volume control section 200 comprises a plurality of position and volume determining potentiometers 222–228, the wiper contacts of which may be set at a plurality of different positions to command a pluarity of voltages corresponding to the desired number of sequential positions obtainable by the yoke 106 of the pump 32.

The logic circuitry 230 is effective to selectively connect the voltages on the various wiper contacts to an output lead 232. The logic circuitry 230 may be of any conventional form such as diode logic gates, relay matrices and the like and may be controlled in a predetermined sequence, for example, by the use of a coded punch tape, the output from a digital computer or any other well known logic control apparatus.

The output lead 232 is connected to a summing node 234 which is, in turn, connected to the input terminal 236 of operational amplifier 238. The output of amplifier 238 is connected through diode 240 to the coil 128 of the solenoid valve 120. The coil 128 controls the position of the valve plate 130 in FIGURES 5 and 6 and consequently, the position of the connecting rod 116 and yoke 106 of the pump 32.

The position feedback potentiometer 142 is connected to the power supply terminals 210 and 212 by leads 242 and 244, respectively. The wiper contact of the potentiometer 142 is mechanically coupled to the arm 146 whereby the connecting rod position, and consequently the angular displacement of the yoke is converted into an electrical feedback signal which is connected by lead 246 to the summing node 234. The right hand side of potentiometer 142 is positive and represents clockwise displacement of the yoke 106 in FIGURE 4, and the left hand side is negative and represents counterclockwise displacement of the yoke. The center of the potentiometer 142 is at zero volts and represents the vertical position a—a of the yoke.

The pressure sensing and override section 202 comprises a plurality of potentiometers 250–254 which are connected in parallel across the voltage buses 214 and 216. The wiper contacts of these potentiometers may be set to provide a plurality of different voltages corresponding to a plurality of predetermined maximum pressures to be set for the hydraulic system of FIGURE 3. These wiper contacts are connected to logic circuitry 256 which is similar to the logic circuit 230 and is adapted to selectively connect the various wiper contacts to an output lead 258 which is connected to one input of an operational amplifier 260. A potentiometer 262 is connected across the voltage buses 214 and 216 and the wiper contact thereof is connected to the other input of the amplifier 260 by lead 263.

This wiper contact is adapted to move in accordance with the pressure variations within the closed loop hydraulic system as measured by a pressure sensitive device of well known construction, such as shown by element 264 of FIGURE 3. Any of the well known means may be employed for effecting the movement of the wiper contact in accordance with pressure variations such as a diaphragm and co-operative mechanical linkage or pressure sensitive electrical transducers in combination with a servo motor.

The output of amplifier 260 is connected to the summing node 234 via lead 266, diode 268, normally closed relay contact 270 and lead 272, on the one hand, and via lead 266, diode 274, normally open relay contact 276, and lead 272 on the other hand. The output of amplifier 260 is also fed back to the input via feedback circuitry 278 which comprises a gain control potentiometer 280 and output limiting Zener diodes 282 and 284. The series combination of Zener diode 282 and normally closed relay contacts 286, and the series combination of Zener diode 284 and normally open relay contacts 288 are connected in parallel across the potentiometer 280. In this manner, the Zener diodes are effective to limit the positive and negative swing of the output voltage from the amplifier 260 by reducing the gain of the amplifier to unity when the output thereof exceeds the Zener breakdown voltage of these diodes.

In operation of the control circuitry, as hereinbefore described with respect to FIGURE 7, a predetermined rate and direction of flow is obtained by programming the logic circuitry 230 to connect to the output lead 232 a voltage from one or a combination of the wiper contacts of potentiometers 222 through 228. The direction of the flow will be determined by the polarity of the voltage on lead 232 and the flow rate will be determined by the magnitude of this voltage. If, for example, the output on lead 232 is selected to be zero, which corresponds to the vertical position of yoke 106 and the yoke is actually displaced clockwise from its vertical position, the wiper contact of the feedback potential will be located to the right of the center of the potentiometer 142, as shown in FIGURE 7, and will therefore supply a positive voltage to the summing node 234. The input to the summing amplifier 238 will therefore be positive, i.e., current will flow through the diode 240 and cause the valve plate 130, shown in FIGURES 5 and 6, to be moved toward its closed position which will, in turn, cause the piston 118 to be moved to the left. Thus, the yoke will be adjusted and moved in a counterclockwise position until the commanded vertical position is achieved, and at that time the voltage lead on 246 and 232 will be equal. This feedback arrangement is effective to maintain the yoke at a zero position as commanded by the logic circuitry. If it is desired to command the yoke to an angular position which is clockwise from the vertical, the logic circuitry will cause a negative voltage to appear on the lead 232, assume for example, —5 volts. If the yoke had previously been at the zero or vertical position, the input to the amplifier 238 would be negative and, due to the diode 240, no current will flow in the solenoid coil 128. This will cause the valve plate 130 to be in its uppermost position wherein the piston 118 will be driven to the right. When the piston and, consequently, the wiper contact of potentiometer 142, reaches a point where the voltage on 246 is a positive 5 volts, i.e., equal to the magnitude of the command signal of —5 volts, the input to the amplifier 238 will be zero. Should the piston move past this point, the net input voltage to the amplifier 238 will become positive and cause the valve plate to be lowered, thereby causing the piston to be driven to the left. In this manner the piston and yoke will be maintained at a position corresponding to the command signal lead on 232, and any errors in actual pump performance will be adjusted by a feedback comparison of commanded performance with actual position of the pump yoke.

If a counterclockwise displacement of the yoke is desired, a positive voltage will be generated on lead 232, and the voltage will have a magnitude proportional to the desired angular displacement. By suitably controlling the logic circuitry 230 such as with a preprogrammed punched tape and a tape read mechanism, any desired sequence of pumping functions may be achieved.

The pressure override system 202 is provided to prevent pressure within the hydraulic system from exceeding a predetermined level, as determined by the logic switching circuitry 256. The logic circuitry 256 functions not only to connect one of the wiper contacts of potentiometers 250 through 254 to the output lead 258, but also controls the relay contacts 270, 276, 286, 288, 290, 292, 294, and 296 in accordance with the position of the yoke 106 or the yoke position commanded by the logic circuitry 230. For example, if the logic circuitry 230 commands a yoke position displaced from the vertical in a clockwise direction, the logic circuitry 256 will prevent energization of the relay (not shown) which controls the various contacts. If on the other hand, the logic circuitry commands an angular position shifted counterclockwise from the vertical, the logic circuitry 256 will energize the relay to close the normally open contacts 288, 276, 290 and 296 and to open the normally closed contacts 286, 270, 292 and 294.

In this manner it can be seen that the energization of the relay controlling contacts 270, 276, 286, 288, 290, 292, 294 and 296 is effective to shift the phase in the various voltages in the pressure override systems 180°. This phase reversal is necessary to decrease excessive pressure by displacing the yoke in an opposite direction from its angular displacement within the pump.

The operation of the pressure override may be best understood by referring to the following example. Assume that the yoke is displaced in a clockwise direction from the vertical by an amount determined by a voltage appearing on lead 232, and assume that a negative voltage of 5 volts (which corresponds to a predetermined maximum pressure) is present on the lead 258. In this situation the relay controlling the relay contacts 270, 276, 286, 288, 290, 292, 294, and 296 is not energized. With reference to the pressure sensing feedback potentiometer 262, the right-hand side of this potentiometer corresponds to higher pressure and the left-hand side corresponds to lower pressure. In other words, as the pressure increases, the wiper contact moves to the right. As long as the pressure within the system remains below the pressure corresponding to the positive 5-volt position of the wiper contact, the net input voltage to the operational amplifier 260 will be negative and since contacts 276 are open, no output voltage is permitted from this amplifier. Should the pressure increase above the predetermined maximum, the voltage at the wiper contact of the potentiometer 262 will increase to a voltage above 5 volts, thus causing a positive output from the operational amplifier 260, which is fed through diode 268 and closed contact 270 to the summing node 234. This voltage will override the voltage appearing on leads 246 and 232 and causes a positive output from the amplifier 238 which, in turn, will control the valve plate 130 to cause the piston 118 to be driven to the left, thereby reducing the pressure. Should the pressure within the system exceed a predetermined maximum by a substantial amount, the output from the amplifier 260 is limited to a value proportional to the Zener voltage of diode 282 to prevent the amplifier 238 from becoming saturated. Once the pressure is reduced to an acceptable level, the output from the amplifier 260 will cease and the direction and volume control signals will be operative to control the yoke position.

If the logic circuitry 230 had commanded a yoke position shifted counterclockwise from the vertical, the logic circuitry 256 would have energized a relay (not shown) to close the normally open contacts 288, 276, 290, and 296 to thereby reverse the polarity of the signal in the pressure override control circuit. Thus, the voltage on lead 258 would be, for example, a +5 volts and the voltage at the wiper contact of potentiometer 262, assuming the pressure to be below the predetermined maximum, would be at least greater (in a positive sense) than a —5 volts, whereby the net input to the operative amplifier 260 would be positive. In this situation, the normally closed relay contact 270 is open and prevents output from the operational amplifier 260, due to a positive input signal, from reaching the summing node 234. However, should pressure increase above a predetermined maximum, the voltage on the tap of the wiper contact of potentiometer 262 will be at a greater negative voltage than —5 volts, whereby the net input to the amplifier 260 will be negative. The output of the amplifier 260 will, therefore, also b enegative, and since normally open relay contact 276 is closed this negative output voltage will, therefore, also be negative, and since normally open tive voltage will override the voltages appearing on leads 232 and 246 to decrease or prevent output from the amplifier 238. This will result in a completely open position for the valve plate 130 and thus the piston will be driven to the left to rotate the yoke in a clockwise direction and to decrease the pressure within the system. Once the pressure is adequately reduced, the output from the amplifier 260 will be zero, and then, the direction and flow rate signals will regain control of the servo positioning mechanism. The Zener diode 284, in this mode of operation, functions in the same manner as the diode 282 to limit the negative output voltage from the amplifier 260.

Having described the features of this invention, it can be seen that a very reliable and safe control system is provided for hydraulically operated machinery. The closed loop hydraulic system, together with the servo control unit which has been described, provide for greatly simplified control apparatus, as compared to prior art arrangements, and induction load requirements for such systems are greatly reduced. Furthermore, there is provided a novel control system for electrically and hydraulically adjusting and controlling a reversible pump of the type described, and all controls can be programmed for an automatic operation of relatively complex devices. The pumping device is controlled both as to its direction and its rate of pumping, and a novel electrical system is provided for commanding pump performance, comparing pump performance, and when necessary, adjusting pump performance. Although the invention has been described with reference to preferred embodiments, many variations in detail will become apparent to those skilled in this art, and all such variations are intended to be included in the scope of the following claims.

What is claimed is:

1. In an injection molding apparatus of the type having (a) an injection molding machine which is hydraulically operated to inject a plastic material into a mold cavity and to press and clamp said material within the mold cavity, and (b) a hydraulic system for controlling the direction and rate of flow of hydraulic fluid to said machine, the improvement in said hydraulic system comprising:

a closed loop of conduits for carrying hydraulic fluid to all parts of said hydraulic system,
a reversible pumping means included within the closed loop of said hydraulic system for pumping hydraulic fluid throughout the system, and
a servo control unit for actuating said pumping means and for dictating rate and direction of flow of hydraulic fluid flow from said pumping means in accordance with a programmed sequence of operation, said servo control unit further comprising:
a piston means fitted within a cylinder for reciprocation back and forth within said cylinder in response to hydraulic pressure differentials established on opposite ends of the piston means,
a modulating valve means contained within the servo control unit for directing high pressure hydraulic fluid from said hydraulic system to opposite ends of said piston means, said modulating valve means being responsive to command signals transmitted in accordance with a preset programmed sequence so that the direction and rate of movement of said piston means can be controlled by said modulating valve means,
programming means for relaying command signals to said modulating valve means, and
a means connected to said piston means for actuating said pumping means and for dictating the rate and direction of fluid flow from said pumping means in accordance with the position of said piston means within said cylinder.

2. The improvement of claim 1 wherein said reversible pump means is of the type having a yoke means which can be positioned within said pump for dictating pumping movements of a plurality of piston elements within said pump, and wherein said yoke means is responsive to positions of said piston means of said servo control unit, whereby direction and rate of flow of said pumping means are determined by the position of said piston means within said servo control unit.

3. The improvement of claim 2 wherein the actual positions of said yoke means are continuously compared to positions dictated by said programmed sequence, and including means for adjusting the positions of said yoke means to agree with the positions dictated by said programmed sequence.

4. The improvement of claim 2 wherein said servo control unit further includes an overriding means for dumping hydraulic fluid from one side of said piston means so as to limit further movements of said piston means.

5. The improvement of claim 4 wherein said overriding means includes an outlet port communicating with the cylinder in which said piston means reciprocates, and including a manually operated valve means for opening said outlet port when hydraulic fluid is to be dumped from said cylinder.

6. The improvement of claim 5 wherein said outlet port means is positioned intermediate the normal range of reciprocation for said piston and in a position which will prevent further travel of said piston in a direction which would dictate a pressing and clamping operation of said injection molding machine but which will permit unclamping and opening movements of the machine, whereby programmed operation of said machine can be manually overridden to prevent any further clamping or pressing actions.

7. The improvement of claim 6 wherein said overriding means functions to place said piston means in a position which sets said yoke means within said reversible pumping means at a slight angle for dictating a low rate of flow of hydraulic fluid to said injection molding machine in a direction of flow which operates said machine in an unclamping direction.

8. The improvement of claim 3 wherein said modulating valve means comprises a solenoid operated valve which is actuated in accordance with electrical signals received from a logic system associated with said programming means, and including means to adjust the signal received by said modulating valve means in accordance with comparisons of actual yoke positions to positions being dictated by the logic system.

9. The improvement of claim 8 wherein said actual positions of said yoke means are relayed to a feedback potentiometer which translates a given position of said yoke means to an electrical signal which can be compared to signals transmitted by said logic system.

10. The improvement of claim 9 wherein said system further includes electrical means for comparing fluid pressures within the system to pressure limits commanded to the system, and including means for overriding signals from said logic system when pressure limits are reached and for adjusting a signal to said modulating valve means.

11. The improvement of claim 10 wherein said electrical means for overriding and adjusting signals from the logic system includes an electrical control system for reversing output polarity from an operational amplifier in accordance with the direction of adjustment which is required to bring the hydraulic system into conformity with commanded performance.

References Cited

UNITED STATES PATENTS

| | | |
|---|---|---|
| 2,334,372 | 11/1943 | Abbott et al. |
| 2,481,991 | 9/1949 | Ernst _____ 18—30 |
| 3,175,509 | 3/1965 | Kuze _____ 103—162 |
| 3,266,434 | 8/1966 | McAlvay _____ 103—162 |

THERON E. CONDON, Primary Examiner

H. A. KILBY, Jr., Assistant Examiner